United States Patent [19]
Johari

[11] Patent Number: 6,008,631
[45] Date of Patent: Dec. 28, 1999

[54] SYNCHRONOUS VOLTAGE CONVERTER

[75] Inventor: Girish Chandra Johari, Austin, Tex.

[73] Assignee: International Business Machines Corporation, Armonk, N.Y.

[21] Appl. No.: 09/271,495

[22] Filed: Mar. 18, 1999

[51] Int. Cl.$^6$ .............................. G05F 1/44; G05F 1/656
[52] U.S. Cl. ........................................... 323/266; 323/222
[58] Field of Search .................................... 323/222, 223, 323/224, 266, 282; 363/95, 97, 131

[56] References Cited

U.S. PATENT DOCUMENTS

| | | | |
|---|---|---|---|
| 4,533,986 | 8/1985 | Jones | 363/17 |
| 5,565,761 | 10/1996 | Hwang | 323/222 |
| 5,861,734 | 1/1999 | Fasullo et al. | 323/222 |
| 5,903,138 | 5/1999 | Hwang | 323/266 |

*Primary Examiner*—Matthew Nguyen
*Attorney, Agent, or Firm*—Leslie Van Leevwen; Joseph Lally

[57] ABSTRACT

A synchronous converter including a control module including a pulse generator configured to produce a pulse. An input port suitable for receiving an input voltage from a voltage source, is couple to a first conversion stage of the converter. The first conversion stage preferably includes a first pair of transistors, a first stage capacitor, and a first winding of a coupled inductor. The first pair of transistors are preferably driven by the control module pulse generator such that the first conversion stage is coupled to the input port during the first interval of the pulse and isolated from the input port during the second interval of the pulse and the gain of the first conversion stage is approximately equal to the duty cycle of the pulse. The converter further includes a second conversion stage preferably including a second pair of transistors, a second stage capacitor, and a second winding of the coupled inductor. The second pair of transistors are preferably driven by the control module pulse generator such that the second conversion stage is coupled to the first conversion stage output during the first interval and isolated from the first conversion stage during the second interval. The gain of the second conversion stage, like the first stage, is approximately equal to the duty cycle of the pulse generator. The first and second conversion stages are coupled by the common inductive core of the coupled inductor.

20 Claims, 3 Drawing Sheets

SYNCHRONOUS VOLTAGE CONVERTER

BACKGROUND

1. Field of the Present Invention

The present invention generally relates to the field of power systems and more particularly to voltage converters for use in computer systems and related technologies.

2. History of Related Art

The simplicity and effectiveness of synchronous converters makes them a popular choice in the design of non-isolated DC to DC voltage converters. The utility of a conventional synchronous converter is limited in a wide variety of applications by constraints on the gain achievable with such circuits (where gain refers to the ratio of the converter's output voltage to input voltage). More specifically, it is desirable in numerous applications to convert a relatively high voltage DC signal to a relatively low DC output signal. The high voltage DC signal is useful for distributing power to various components of a system with a minimum of distribution loss. The high voltage signal is typically not, however, preferred at the load point for many applications and thus it is frequently necessary to implement a DC voltage converter with a gain significantly less than one (i.e., a converter capable of producing a low voltage output from a high voltage input). Most notably in computer system applications, the desired load point voltage has decreased in recent years while the power and current requirements has increased, especially in high performance computer systems commonly referred to in the industry as enterprise systems. Enterprise systems are typically characterized by multiple high speed processors, high performance I/O and memory cards, and correspondingly, extremely high current and power requirements. The power demands of such systems place heightened significance on methods and circuits that are able to minimize distribution losses. Historically, it is known that distribution of DC power at the highest possible voltage is desirable to minimize $I^2R$ power dissipation where R refers to the impedance of the distribution medium. In contrast to the demand for high distribution voltages, the trend in the supply voltages required for sub-micron semiconductor technologies used in state of the art computer systems is towards increasingly lower voltages. Where 12V and 5V supplies were once employed, 3.3V and 1.8V supplies are now implemented to combat well documented sub-micron effects of semiconductor transistors. The simultaneous desire for increasingly greater distribution voltages and increasingly lower load point voltages create a demand for DC to DC converters with gains significantly less than unity. Moreover, because these converters are typically packaged in close proximity to system electronics and because of the ever present demand to minimize the system package, it is highly desirable to implement the converter in the smallest and most cost effective manner available. Conventional synchronous converters offered these benefits for systems in which the gain required of the converter was not too demanding. For state of the art enterprise systems, however, conventionally designed synchronous converters typically cannot perform adequately because of fundamental limitations in the duty cycle associated with the pulse width modulation scheme utilized in synchronous designs. In conventional synchronous converters, the gain is proportional to the duty cycle of the pulse signal used to drive the converter. Unfortunately, practical limitations on the lower limits of achievable duty cycles limit the performance (i.e., the gain) of the converters. Due to the presence of inevitable stray capacitance, the pulse signal produced by any system will require finite rise and fall times that place fundamental limits on the duty cycles achievable. These limitations impose a significant constraint on the ability of system designers and manufacturers to minimize power dissipation in high performance computer systems through the use of a high voltage distribution system. Therefore it would be highly desirable to implement a converter incorporating the benefits of conventional synchronous designs while simultaneously enabling significantly wider latitude in the output voltage to input voltage ratio. Moreover, it would be desirable to implement such a design with at a minimum cost, complexity, and dimension, in a design compatible for use in close proximity to high speed, low voltage digital circuitry without diminishing the system reliability or performance.

SUMMARY OF THE INVENTION

The problems identified above are in large part addressed by a synchronous converter in which a single inductive element, referred to herein as a coupled inductor, is implemented to couple a first conversion stage with a second conversion stage to produce a converter with a gain significantly less than unity. In addition, the coupled inductor improves the dynamic performance of the converter resulting in decreased ripple voltage at the converter output. These benefits are achieved with a minimal increase in the design complexity and cost of a conventional pulse width modulated synchronous converter. The use of first and second conversion stages includes a pair of coupling transistors that provide inherent over voltage protection without requiring dedicated over voltage circuitry necessitated in conventional converter designs.

Broadly speaking, the present invention contemplates a synchronous converter comprising a control module including a pulse generator configured to produce a pulse. The pulse is comprised of a first interval and a second interval, where the duty cycle of the pulse equals the ratio of the first interval to the sum of the first and second intervals. An input port suitable for receiving an input voltage from a voltage source, is couple to a first conversion stage of the converter. The first conversion stage preferably includes a first pair of transistors, a first stage capacitor, and a first winding of a coupled inductor. The first pair of transistors are preferably driven by the control module pulse generator such that the first conversion stage is coupled to the input port during the first interval of the pulse and isolated from the input port during the second interval of the pulse and the gain of the first conversion stage is approximately equal to the duty cycle of the pulse. The converter further includes a second conversion stage preferably including a second pair of transistors, a second stage capacitor, and a second winding of the coupled inductor. The second pair of transistors are preferably driven by the control module pulse generator such that the second conversion stage is coupled to the first conversion stage output during the first interval and isolated from the first conversion stage during the second interval. The gain of the second conversion stage, like the first stage, is approximately equal to the duty cycle of the pulse generator. The converter further includes an output port coupled to the second conversion stage output. Utilizing the gains of the first and second converters in series produces a synchronous converter with a gain approximately equal to the square of the duty cycle.

In the presently preferred embodiment, the first pair of transistors includes a first coupling transistor connected in series between the input port and the first winding of the coupled inductor and a first grounding transistor connected between ground and the first winding of the coupled inductor. An input capacitor coupled in parallel across the input port is preferably included in the converter. The first stage capacitor is preferably connected between the output of the first conversion stage and ground. Similarly, the second pair of transistors preferably includes a second coupling transistor coupled in series between the output of the first conversion stage and the second winding of the coupled inductor and a second grounding transistor coupled between ground and the second winding of the coupled inductor. The second stage capacitor is suitably coupled across an output port of the converter. The coupled inductor in the preferred embodiment includes a common inductive core around which the first and second windings are wound. Preferably a common signal from the control module drives the inputs to the grounding transistor of the first transistor pair and the grounding transistor of the second transistor pair while unique control module signals drive the inputs to the coupling transistor of the first transistor pair and the coupling transistor of the second transistor pair.

The present invention further contemplates a computer system including a distribution power supply, a synchronous converter, and a processor board. The distribution power supply includes an input port suitable for receiving a line voltage such as an externally supplied AC voltage. The power supply is suitable to produce a DC distribution voltage signal output. The synchronous converter includes first and second conversion stages coupled by a common inductive element as indicated above. In one embodiment, the output voltage of the synchronous converter is approximately 3.3 V and the input voltage of the distribution power supply output is in the range of approximately 5 V to 52 V. In another embodiment emphasizing the range in gain available with the present invention, the output voltage of the synchronous converter is less than approximately 5 V and the input voltage of the distribution power supply output is in excess of approximately 24 V.

BRIEF DESCRIPTION OF THE DRAWINGS

Other objects and advantages of the invention will become apparent upon reading the following detailed description and upon reference to the accompanying drawings in which.

Figure 1:
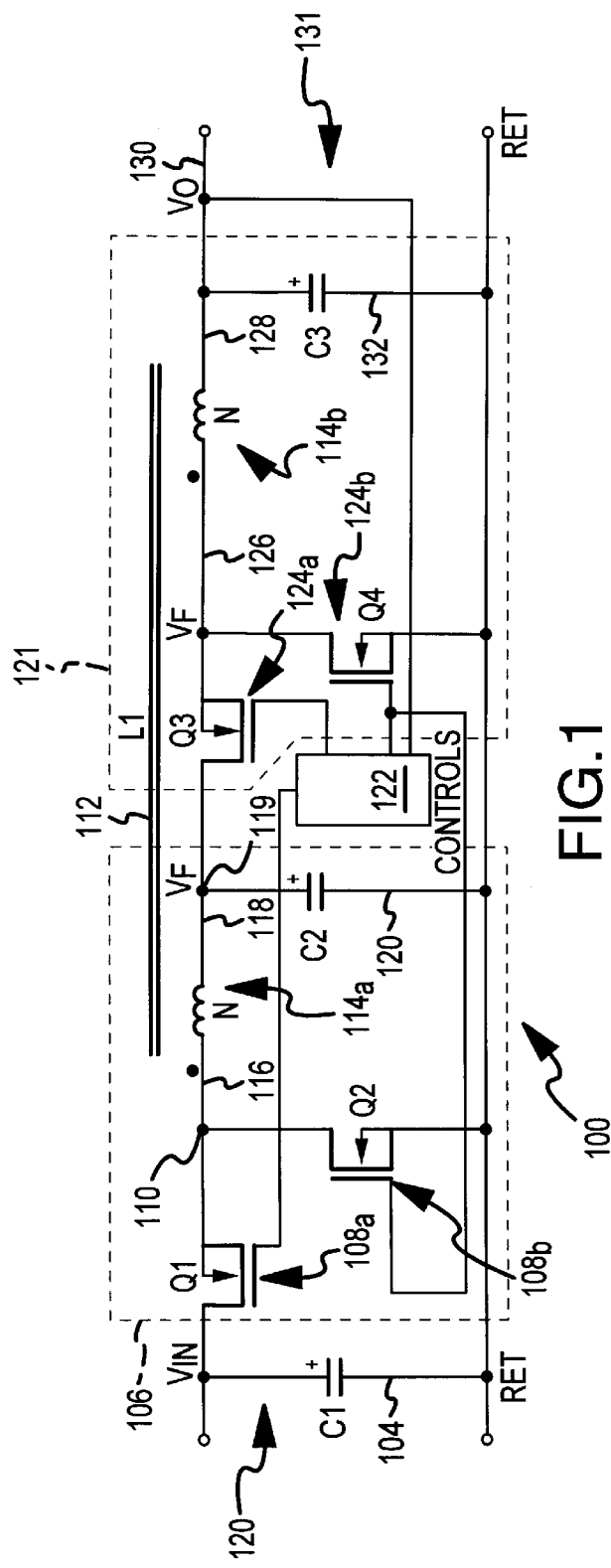
FIG. 1 is circuit diagram of one embodiment of a synchronous converter according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 5:
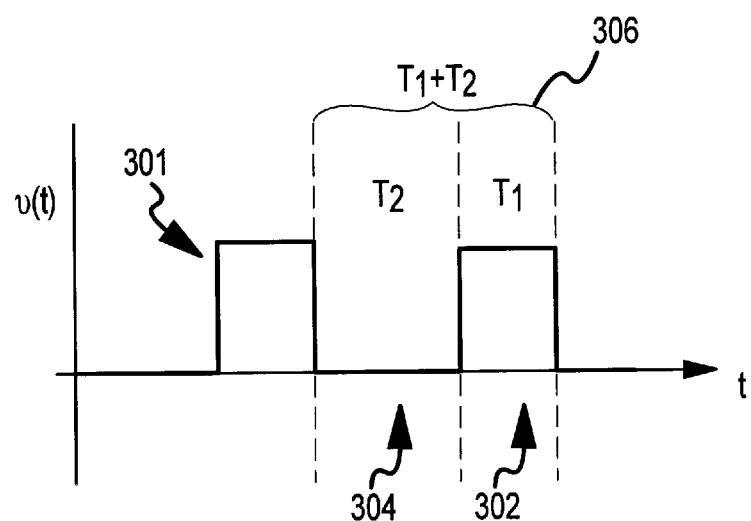
FIG. 5 is a representation of a pulse signal produced by a control module of the synchronous converter of the present invention indicating the first and second intervals and the duty cycle of the signal.

Turning now to the drawings, FIG. 1 depicts a circuit diagram of a synchronous converter 100 according to the present invention. Synchronous converter 100 is designed to produce a relatively low voltage DC output signal from a relatively large DC input signal utilizing pulse width modulation control. Synchronous converters beneficially enable the use of relatively high DC voltages in high end computer system for distributing power to the various components of the system to minimize distribution currents and losses. Synchronous converters are required to generate power signals compatible with state of the art semiconductor devices from the distributed power signals. The embodiment of synchronous converted 100 depicted in FIG. 1 includes a control module 122 suitable for generating a periodic pulse signal. Turning briefly to FIG. 5, a pulse signal 301 representative of the pulse signal produced by control module 122 is shown. Pulse signal 301 includes a first interval T1 302 during which pulse signal 301 assumes a high voltage and a second interval T2 304 during which signal 301 assumes a low voltage. The duty cycle of pulse signal 301 is defined for purposes of this disclosure as the ratio of first interval T1 302 to the sum of first interval T1 302 and second interval T2 304 (this sum is represented in FIG. 5 by reference numeral 306). The present invention contemplates controlling the gain of synchronous converter 100 by adjusting the duty cycle of pulse signal 301 produced by control module 122.

Returning now to FIG. 1, synchronous converter 100 further includes an input port 102, a first conversion stage 106, a second conversion stage 121, and an output port 131. First conversion stage 106 and second conversion stage 121 are electrically coupled by inductor 112 referred to herein as coupled inductor 112. First conversion stage 106 includes a first pair of transistors 108a and 108b (collectively referred to as first pair of transistors 108), a first stage capacitor 120, and a first winding 114 of coupled inductor 112. First pair of transistors 108 are driven by the pulse generator of control module 122 in a manner such that first conversion stage 106 is coupled to input port 102 during first interval T1 302 of pulse signal 301. During second interval T2 304 of pulse signal 301, first conversion stage 106 is isolated from input port 102. In a similar manner, second conversion stage 121 includes a second pair of transistors 124a and 124b (collectively referred to as second pair of transistors 124), a second stage capacitor 132, and a second winding 114 of coupled inductor 112. Second pair of transistors 124 are driven by the pulse generator of control module 122 in a manner such that second conversion stage 121 is coupled to first conversion stage output node 119 of first conversion stage 106 during first interval T1 304 of pulse signal 301. During second stage T2 304 of pulse signal 301, second conversion stage 121 is isolated from first conversion stage 106. The gain of both the first conversion stage 106 and the second conversion stage 121 are approximately equal to the duty cycle of pulse signal 301 where, for purposes of this disclosure, the gain of first conversion stage 106 refers to the ratio of the voltage at first conversion stage output node 119 to the voltage applied to input port 102 and the gain of second conversion stage 121 refers to the ratio of the voltage at output port 131 to the voltage at first conversion stage output node 119. It will be appreciated that since the duty cycle of pulse signal 301 is guaranteed to be less than unity, the gain of both first conversion stage 106 and second conversion stage 121 are less than one. Moreover, it will be appreciated that because the output of first conversion stage 106 is coupled to the input of second conversion stage 121, the overall gain of synchronous converter 100 is the series product of the first stage gain and the second stage gain. Accordingly, the overall gain of synchronous converter 100 is approximately equal to the square of the duty cycle of pulse signal 301. Thus it will be appreciated that by incorporating a pair of windings into a common inductive element and coupling to provide coupling between first conversion stage 106 and second conversion stage 121, the present invention achieves an exponential gain factor with a minimal increase in hardware over a single stage converter.

Returning to the details of the embodiment of synchronous converter 100 as depicted in FIG. 1, first pair of transistors 108 includes a first coupling transistor 108a and a first grounding transistor 108b. First coupling transistor 108a is preferably a MOSFET device in which the source/drain terminals serve as the output terminals for the device and are coupled in series between input port 102 and a first node 110. The gate terminal of first coupling transistor 108a, like the gates of all of the depicted transistors in synchronous converter 100, is controlled by control module 122. Those familiar with MOS circuits will appreciate that pulse signal 301 will drive the MOS transistors comprising synchronous converter 100 from a saturation or "on" condition to a cut-off or "off" condition. By providing appropriate inverters within control module 122, first coupling transistor 108a and first grounding transistor 108b are preferably provided with complementary driving signals such that whenever first coupling transistor 108a is on, first grounding transistor is off and vice versa. In this manner, ac current path is continuously maintained to assure continuity of the current flowing through first winding 114a of coupled inductor 112. In a presently preferred embodiment, first pair of transistors 108 are implemented as p-channel devices. The output or source/drain terminals of first grounding transistor 108b are connected between ground and first node 110. First node 110 is preferably still further connected to a first terminal 116 of first winding 114a of coupled inductor 112. Coupled inductor 112 includes a single inductive core element around which a pair of windings 114a and 114b are wrapped. The ratio of the voltage across first winding 114a to the voltage across second winding 114b is equal to the ratio of the turns N1 in first winding 114a to the turns N2 in second winding 114b. By coupling first and second conversion stages 106 and 121 with a common inductive core element, coupled inductor 112 improves the dynamic response of synchronous converter 100 by providing a mechanism in which energy required at output port 131 to accommodate a sudden change in output loading is partially satisfied by a transfer of energy stored within coupled inductor 112 from first winding 114a to second winding 114b as will be discussed in greater detail below.

Returning again to details of the preferred embodiment of synchronous converter 100 presented in FIG. 1, second pair of transistors 124 of second conversion stage 121 include second coupling transistor 124a and second grounding transistor 124b. The output or source/drain terminals of second coupling transistor 124a are connected in series between second terminal 118 of first winding 114a and the first terminal 126 of second winding 114b. The output terminals of second grounding transistor 124b are connected between first terminal 126 of second winding 114b and ground. The input or gate terminals of the second pair of transistors 124 are driven by the pulse generator of control module 122 such that when second coupling transistor 124a is on, second grounding transistor 124b is off and vice versa. In this manner, a current path is continuously maintained to insure current continuity in second winding 114b of coupled inductor 112. Moreover, in the preferred embodiment, control module 122 insures that first and second coupling transistors 108a and 124a are switched on and off simultaneously and likewise for first and second grounding transistors 108b and 124b. In the case of first and second grounding transistors 108b and 124b respectively, this synchronization is accomplished simply by connecting the gate terminals of both transistors to a common signal 123 of control module 122. Because the source terminals of both grounding transistors are grounded, the threshold voltages of the two transistors are the same (under the reasonable assumption that both transistors are fabricated with a common semiconductor process) and a single voltage signal 123 is sufficient to drive both transistors. First and second coupling transistors 108a and 124a, on the other hand, do not have their source terminals tied to a common reference point. Accordingly, unique first and second signals 125a and 125b are provided to gate terminals of the respective coupling transistors to accommodate the differing source terminal voltages of the two transistors. Although signals 125a and 125b are unique, it is contemplated in the preferred embodiment that the signals act in concert to keep first coupling transistor 108a and second coupling transistor 124a in phase with each other (i.e., both transistors are either on or off). As indicated previously, the first terminal 126 of second winding 114b is coupled to output terminals of both the second coupling transistor 124a and the second grounding transistor 124b in the preferred embodiment of synchronous converter 100. A second terminal 128 of second winding 114b is connect to output terminal 130 of output port 131 while second stage capacitor 132 is connected in parallel across output port 131 between ground and output node 130.

As noted earlier, the gain of synchronous converter 100 is approximately equivalent to the square of the duty cycle of pulse signal 301. In an embodiment of the present invention for use in systems utilizing large DC voltages to minimize distribution power loss, an acceptable input voltage for use with synchronous converter 100 is in the range of approximately 5 to 52 V and the output voltage is approximately 3.3 V to achieve compatibility with deep sub-micron semiconductor technologies used in the vast majority of present day computer systems. These values are accommodated using synchronous converter 100 of pulse signal 310 with a duty cycle that varies from approximately 81% for the 5V input voltage to approximately 25% for the 52 V input. These duty cycle values are well within the practical operating range of most conventionally designed pulse width modulators. In another embodiment emphasizing the large step down factor achievable with the design of synchronous converter 100 as described herein, the input voltage is specified as greater than approximately 24V and the output voltage is less than approximately 3.5 V. Thus synchronous converter 100 enables distribution of power within a system using voltage levels that exceed the voltage levels suitable for operating the circuitry of the system by a factor of approximately 5 to 25 thereby significantly reducing distribution power losses associated with distributing power at or near the operating voltages of the associated circuitry.

Figure 2:
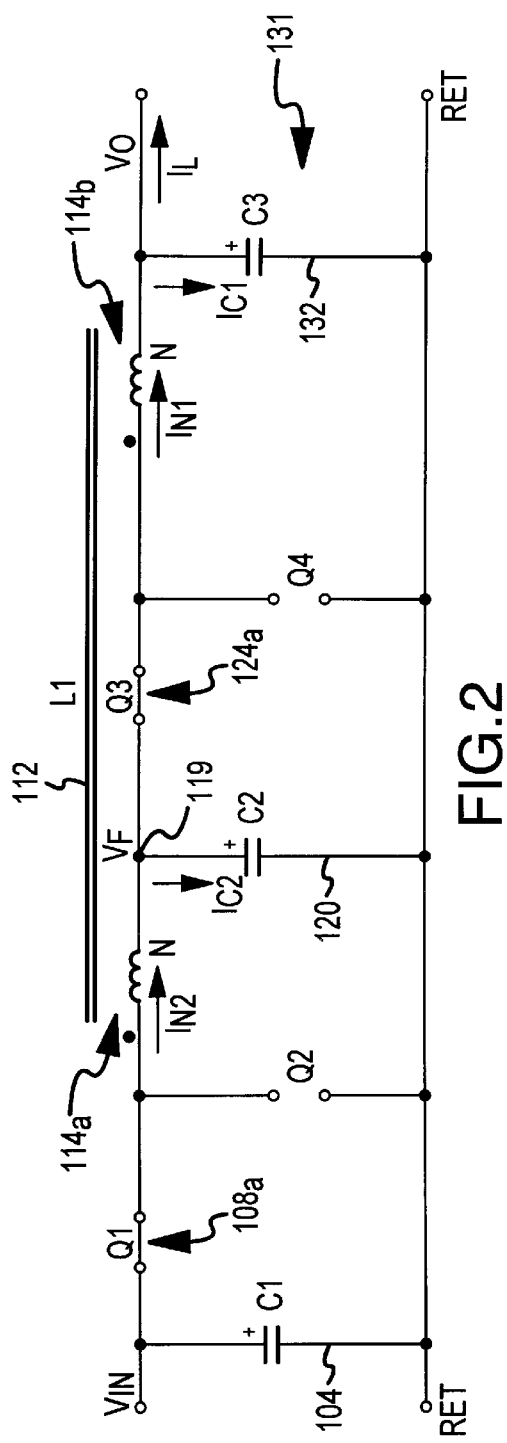
FIG. 2 is a diagram of an idealized equivalent circuit of the converter of FIG. 1 during a first interval of a pulse signal generated by a control module of the converter.
Figure 3:
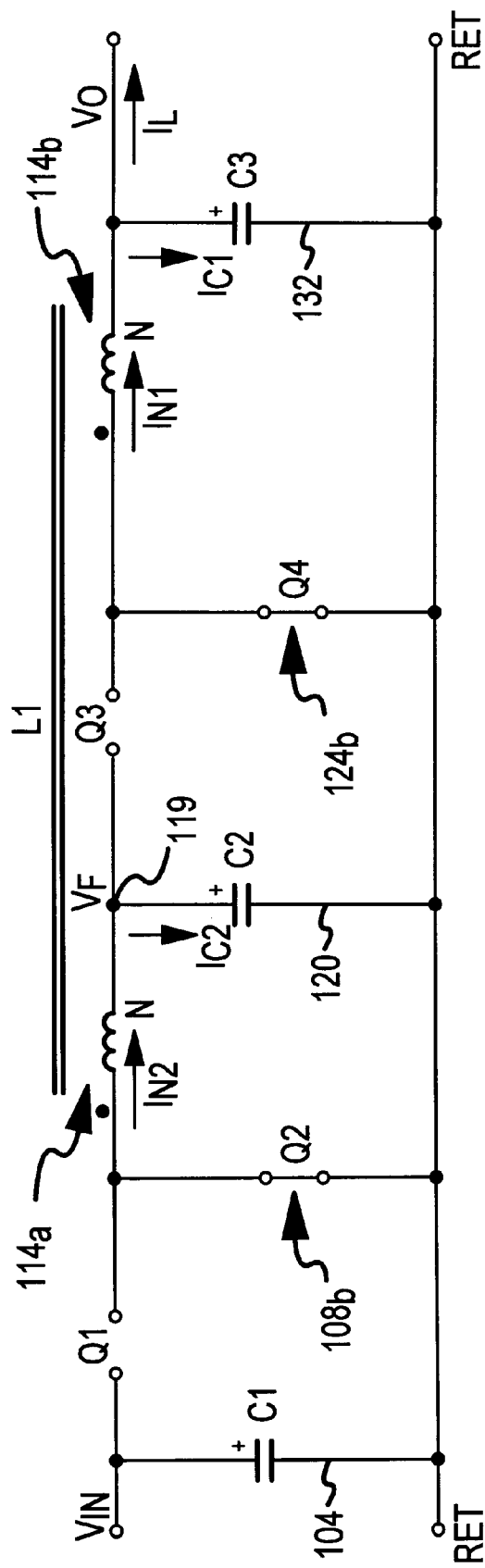
FIG. 3 is a diagram of an idealized equivalent circuit of the converter of FIG. 1 during a second interval of a pulse signal generated by a control module of the converter.

Turning now to FIGS. 2 and 3, the improvements in dynamic response achieved with the design presented herein are presented. FIG. 2 is an idealized representation of synchronous converter 100 during T1 302 of pulse signal 301 when the first and second coupling transistors 108a and 124a are on and the first and second grounding transistors 108a and 108b are off. In this idealized representation of synchronous converter 100, the source-drain impedance of the saturated transistors and the leakage currents of the cut-off transistors are neglected. Using these assumptions, it will be appreciated that the output current IL will experience a step increase if a load is attached to output port 131. This step increase in IL will produce a drop in the voltage across output port 131 as charge is drained from second stage capacitor 132 to accommodate the load requirements. This drop in output voltage will necessitate a drop in the intermediate voltage VF at node 119 to maintain a constant volts/turn ratio between the coupled first and second windings 114a and 114b. The decrease in VF can only come about if IC2, which represents the current associated with first stage capacitor 120, decreases. Because IC2=IN1−IN2, a decrease in IC2 indicates a corresponding decrease in IN1−IN2. In other words, the coupling of the first and second windings 114a and 114b produces a condition in which an increase in the load current requirements results in a shift of current from first winding 114a to second winding 114b. This current shift has the effect of reducing the energy required of second stage capacitor 132 to accommodate the load requirements thereby beneficially reducing the ripple at output node 130. In the event of a step decrease in load current, such as when a load is removed from synchronous converter 100, an opposite effect occurs and current is shifted from second winding 114b to first winding 114a such that second stage capacitor 132 is not solely responsible for accommodating the step in current and the output voltage ripple is again minimized. FIG. 3 presents an idealized circuit of synchronous converter 100 during second interval T2 304 of pulse signal 301. During T2 304, first and second coupling transistors 108a and 124a are open circuit while first and second grounding transistors 108b and 124b are short circuits in this idealized representation. When a step in output current is encountered in this circuit, the voltage Vo at output node 130 will dip as second stage capacitor 132 begins to discharge to accommodate the change in output current. Since Vo is the voltage across second winding 114b, the coupling of the first and second windings will result in a drop in Vf, which represents the voltage across first winding 114a to maintain the volt/turn ration of the two windings. The drop in Vf is accommodated by a transfer of energy from first winding 114a to second winding 114b through the inductive coupling of the common inductive core element. As more energy is transferred to second winding 114b, more of the load current requirement can be satisfied from second winding 114b thereby requiring less energy from second stage capacitor 132 and thereby resulting in reduced ripple voltage at output node 130.

Figure 4:
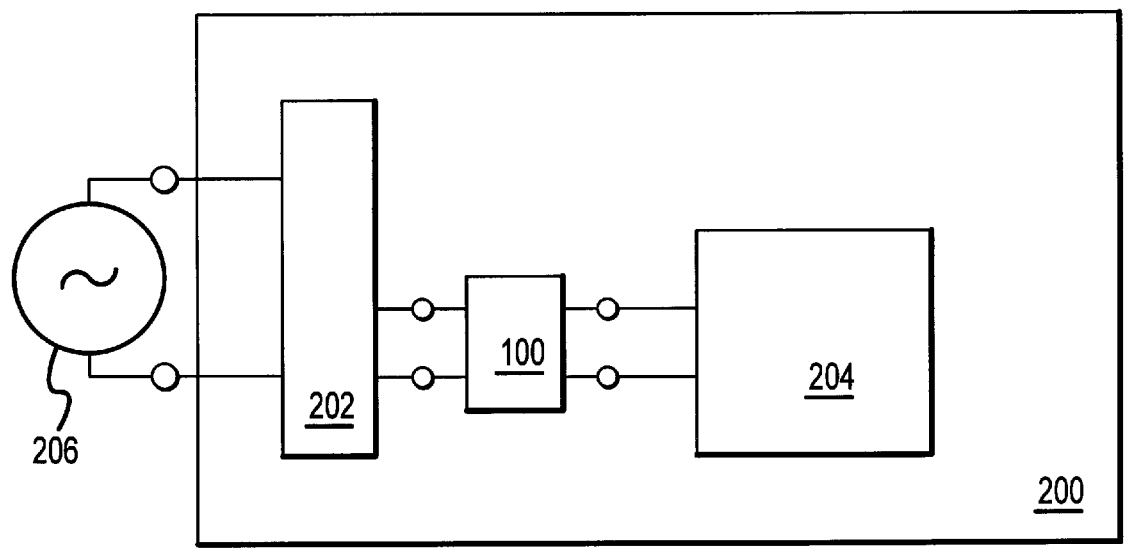
FIG. 4 is a simplified block diagram of a computer system according to present invention including a distribution power supply and a synchronous converter according to the present invention.

Turning now to FIG. 4, a computer system 200 is presented in a simplified block diagram emphasizing the system's power distribution and conversion facilities. Computer system 200 includes an input port 201 to which a power supply 202 is connected. Input port 201 and power supply 202 are suitably configured to receive a line voltage 206 from an external power source such as conventionally provided 120 or 220 V AC power. In an embodiment designed to minimize power distribution losses associated with low voltage DC signals, power supply 202 produces an output voltage in the range of approximately 5 to 52 volts and still more preferably in the range of approximately 24 to 52 volts. To accommodate operating voltages of commercially available semiconductor devices, a synchronous converter 100 according to the present invention as discussed in the preceding text is connected to power supply 202 to receive the power supply output voltage and to generate a low voltage signal output suitable for powering sub micron semiconductor circuitry. Accordingly, system 200 includes a processor board 204 coupled to and powered by synchronous converter 100. Processor board 204 is typically comprised of a printed circuit board to which one or more central processing units (CPUs) are connected. In addition to the processor board, those familiar with the design of enterprise or high end computer systems will recognize that other boards such as a memory board or I/O board may also be suitably supplied by synchronous converter 100.

It will be apparent to those skilled in the art having the benefit of this disclosure that the present invention contemplates a synchronous converter incorporating first and second conversion stages coupled by a common inductive element to achieve wide latitude in the input voltage to output voltage ratio. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A synchronous converter comprising:

a control module including a pulse generator configured to produce a pulse comprising a first interval and a second interval, and wherein a duty cycle of the pulse equals the ratio of the first interval to the sum of the first and second intervals;

an input port suitable for receiving an input voltage from a voltage source;

a first conversion stage comprising a first pair of transistors, a first stage capacitor, and a first winding of a coupled inductor, wherein the first pair of transistors are driven by the control module pulse generator wherein the first conversion stage is coupled to the input port during the first interval and isolated from the input port during the second interval and wherein the gain of the first conversion stage is approximately equal to the duty cycle of the pulse;

a second conversion stage comprising a second pair of transistors, a second stage capacitor, and a second winding of the coupled inductor, wherein the second pair of transistors are driven by the control module pulse generator wherein the second conversion stage is coupled to an output of the first conversion stage during the first interval and isolated from the first conversion stage during the second interval and wherein the gain of the second conversion stage is approximately equal to the duty cycle of the pulse; and an output port coupled to an output of the second conversion stage whereby the gain of the synchronous converter is approximately equal to the square of the duty cycle.

2. The converter of claim 1, wherein the first pair of transistors includes a first coupling transistor wherein output terminals of the first coupling transistor are coupled in series between the input port and the first winding of the coupled inductor.

3. The converter of claim 1, wherein the first pair of transistors includes a first grounding transistor wherein output terminals of the first grounding transistor are coupled between ground and the first winding of the coupled inductor.

4. The converter of claim 1, wherein the synchronous converter further includes an input capacitor coupled in parallel across the input port.

5. The converter of claim 1, wherein the first winding of the coupled inductor is connected in series between the output of the first conversion stage and a common node of the first pair of transistors.

6. The converter of claim 1, wherein the first stage capacitor is connected between the output of the first conversion stage and ground.

7. The converter of claim 1, wherein the second pair of transistors includes a second coupling transistor wherein output terminals of the second coupling transistor are coupled in series between the output of the first conversion stage and the second winding of the coupled inductor.

8. The converter of claim 1, wherein the second pair of transistor includes a second grounding transistor wherein output terminals of the second grounding transistor are coupled between ground and the second winding of the coupled inductor.

9. The converter of claim 1, wherein the second winding of the coupled inductor is connected in series between the output of the second conversion stage and a common node of the second pair of transistors.

10. The converter of claim 1, wherein the second stage capacitor is connected between the output of the synchronous converter and ground.

11. The converter of claim 1, wherein the coupled inductor comprises the first and second windings around a common inductive core.

12. The converter of claim 1, wherein a common signal of the control module drives the inputs to a grounding transistor of the first transistor pair and a grounding transistor of the second transistor pair.

13. The converter of claim 1, wherein unique signals from the control module drive the inputs to a coupling transistor of the first transistor pair and a coupling transistor of the second transistor pair.

14. A computer system, comprising:
a distribution power supply including an input port suitable for receiving a line voltage, wherein the distribution power supply is configured to output a distribution voltage signal;
a synchronous converter, comprising:
a control module including a pulse generator configured to produce a pulse comprising a first interval and a second interval, and wherein a duty cycle of the pulse equals the ratio of the first interval to the sum of the first and second intervals;
an input port coupled to the output of the distribution power supply;
a first conversion stage driven by the control module pulse generator wherein the gain of the first conversion stage is approximately equal to the duty cycle of the pulse;
a second conversion stage driven by the control module pulse generator wherein the gain of the second conversion stage is approximately equal to the duty cycle of the pulse; and
wherein the first and second conversion stages are coupled by an common inductive element; and
a processor board coupled to the output of the synchronous converter.

15. The system of claim 14, wherein the output of the distribution power supply is a DC signal.

16. The system of claim 15, wherein the output voltage of the synchronous converter is approximately 3.3 V and the input voltage of the distribution power supply output is in the range of approximately 5 V to 52 V.

17. The system of claim 15, wherein the output voltage of the synchronous converter is less than approximately 5 V and the input voltage of the distribution power supply output is in excess of approximately 24 V.

18. The system of claim 14, wherein the common inductive element comprises an inductive core around which first and second windings are wound, wherein the first winding is associated with the first conversion stage and the second element is associated with the second conversion stage.

19. A DC voltage converter, comprising:
an input port suitable for receiving a input voltage from a DC voltage source;
an input capacitor coupled across the input port;
a first coupling transistor, coupled in series between the input port and a first node;
a first grounding transistor, connected between ground and the first node;
a coupled inductor comprising first and second windings around a common inductive core, wherein a first terminal of the first winding is connected to the first node;
a first stage capacitor coupled between ground and a second terminal of the first winding;
a second coupling transistor coupled in series between the second terminal of the first winding and a first terminal of the second winding;
a second grounding transistor coupled between the first terminal of the second winding and ground;
an output capacitor coupled between ground and an output terminal of the DC converter connected to the second terminal of the second winding and ground; and
a control module including a pulse generator configured to produce a pulse comprising a first interval and a second interval, wherein the control module is connected to input terminals of the first and second coupling transistors and the first and second grounding transistors such that the first and second coupling transistors are on during the first interval of the pulse and off during the second interval and the first and second grounding transistors are on during the first interval and off during the second interval.

20. The converter of claim 19, wherein the control module is further configured to monitor the output voltage of the DC voltage converter with a signal connected between the control module and the output terminal of the DC converter.

* * * * *